F. M. OSBORNE.
PIT CAR AXLE.
APPLICATION FILED OCT. 16, 1916.
1,225,166. Patented May 8, 1917.
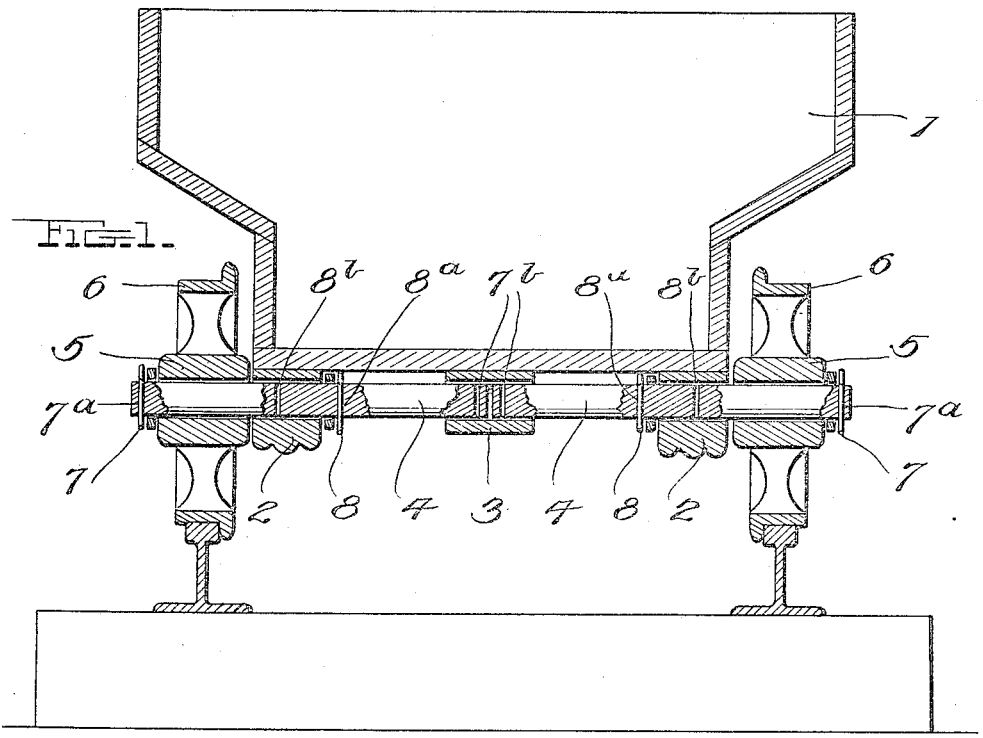
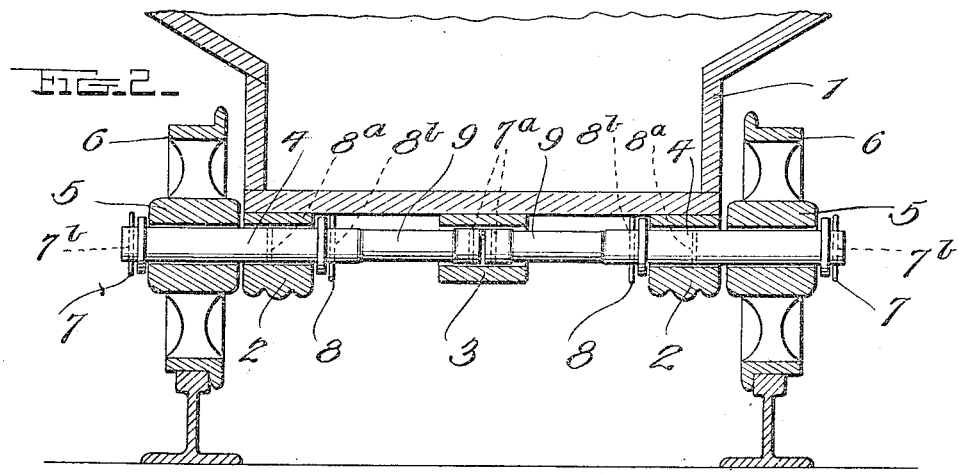
Witness
J. N. Pierce
Inventor
F. M. Osborne
By H. B. Willson & Co.
Attorneys

UNITED STATES PATENT OFFICE.

FRANCIS M. OSBORNE, OF WASHINGTON, PENNSYLVANIA.

PIT-CAR AXLE.

1,225,166. Specification of Letters Patent. Patented May 8, 1917.

Application filed October 16, 1916. Serial No. 125,919.

*To all whom it may concern:*

Be it known that I, FRANCIS M. OSBORNE, a citizen of the United States, residing at Washington, in the county of Washington and State of Pennsylvania, have invented certain new and useful Improvements in Pit-Car Axles; and I do declare the following to be a full, clear, and exact description of the invention, such as will enable others skilled in the art to which it appertains to make and use the same.

My invention aims to provide a pit car axle so constructed as to permit further use of the axle even after it has become worn to the extent which would under the present day methods cause it to be discarded, and further aims to so construct the improved axle as to permit it to be more easily removed from the car than the axles now in use.

Pit car axles as now constructed are formed of a single length of steel shafting extending beneath the car and through the wheels, the latter being held in place by cotter pins at the outer ends of their hubs. The axle is held in place beneath the car by two bearings, one beneath each side of the car, and within these bearings the axle is permitted to rotate.

The objections to this style of axle are that frequently it is worn thinner where the wheel revolves around it, and bends at the inner side of the car wheel and often breaks at this point. Under such circumstances it becomes necessary to remove the full length axle from the car in order to straighten it or to replace it by a new axle. This causes a considerable amount of work which is attended with great inconvenience, loss of time, and loss of the full length axle even though only one end thereof may be injured.

My invention is an axle formed of two parts equal in length and design, interchangeable, and reversible, with four cotter pin holes in each part and an extra bearing under the car receiving the inner ends of the two halves to support them along one continuous center line.

In the accompanying drawings,

Figure 1 discloses a sectional view of a pit car with the improved axle applied, parts of said axle being in elevation;

Fig. 2 is a view similar to Fig. 1 with the worn halves of the axle reversed for further use.

In the drawings above briefly described, the numeral 1 designates the body of a pit car of the usual or any preferred construction, said body having bearings 2 beneath its opposite sides and a third bearing 3 at its center in alinement with the other bearings. The axle is formed of two halves 4 symmetrical in all respects, each half being of the same diameter throughout its length as shown clearly in Fig. 1.

The inner ends of the halves 4 are received rotatably in the bearing 3 while the intermediate portions of said halves are rotatably mounted in the bearings 2, their outer ends being received loosely in the hubs 5 of the usual flanged wheels 6. The parts are held in these positions by outer and inner cotter pins 7 and 8, said pins 8 being located at the inner ends of the bearings 2 while the pins 7 pass through the outer ends of the halves 4 and prevent the wheels from moving endwise therefrom.

The pins 7 may be passed through openings $7^a$ at one end of the halves 4 as shown in Fig. 1 or through other openings $7^b$ at the other ends of said halves when the latter are reversed as depicted in Fig. 2. When the pins 7 are passed through the openings $7^a$, the pins 8 are passed through openings $8^a$ in the halves 4 but when the sections are reversed, openings $8^b$ spaced from $8^a$ receive said pins 8. The openings $7^a$ and $8^a$ of each half 4 are spaced the same distance apart as the openings $7^b$ and $8^b$ in order to permit the above operation, as will be clear from the drawings.

By the construction above described, when the two halves 4 have been in use as shown in Fig. 2 for a considerable length of time, and the ends thereof have become worn from rotation of the hubs 5 thereon, said halves may be reversed as depicted in Fig. 2 so that the worn inner ends 9 thereof will no longer receive the wear from the wheels. Also if the outer end of either half 4 should become bent, it is an easy matter to remove, straighten and replace such half without inverting the entire car as is now necessary. Similarly, a broken half may be easily removed and replaced and the other half may remain in use, it being therefore unnecessary to discard the full length of the axle on account of a break at one end.

The advantages just pointed out render the improved axle advantageous for use on pit cars, and in view of such advantages the exact construction shown and described constitutes the preferred form of the axle. It is to be understood, however, that within the scope of the invention as claimed numerous changes may be made without sacrificing the principal advantages.

I claim:—

The combination with a car body, of a pair of bearings carried thereby beneath the sides thereof, a central bearing alined with the other bearings, and a pair of reversible axle halves uniform in size and shape, said halves having their inner ends received rotatably in the central bearing and having their intermediate portions similarly received in the other bearings, the outer ends of said halves receiving rotatably thereon the wheels of the car, each of said axle halves having a pair of openings through which inner and outer pins are to be passed to respectively hold said halves against outward shifting and to prevent removal of the wheels, and also having an additional pair of similarly spaced openings to receive said pins when said halves are reversed.

In testimony whereof I have hereunto set my hand in the presence of two subscribing witnesses.

FRANCIS M. OSBORNE.

Witnesses:
 BARBARA DONNER,
 GEO. R. MOSLEY.

Copies of this patent may be obtained for five cents each, by addressing the "Commissioner of Patents, Washington, D. C."